(12) United States Patent
Sridhar et al.

(10) Patent No.: US 9,485,182 B2
(45) Date of Patent: Nov. 1, 2016

(54) METHOD FOR IMPROVED LOAD BALANCING IN COMMUNICATION SYSTEMS

(75) Inventors: Kamakshi Sridhar, Plano, TX (US); Thomas W. Anderson, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 122 days.

(21) Appl. No.: 13/173,123

(22) Filed: Jun. 30, 2011

(65) Prior Publication Data

US 2013/0003548 A1 Jan. 3, 2013

(51) Int. Cl.
*H04L 12/26* (2006.01)
*H04L 12/803* (2013.01)
*H04W 28/02* (2009.01)
*H04W 28/08* (2009.01)
*H04W 88/08* (2009.01)
*H04W 92/04* (2009.01)

(52) U.S. Cl.
CPC ........ *H04L 47/125* (2013.01); *H04W 28/0236* (2013.01); *H04W 28/0242* (2013.01); *H04W 28/0247* (2013.01); *H04W 28/08* (2013.01); *H04W 88/08* (2013.01); *H04W 92/045* (2013.01)

(58) Field of Classification Search
CPC ..................... H04W 28/0242; H04W 28/0236
USPC ......................................................... 370/235
See application file for complete search history.

(56) References Cited

U.S. PATENT DOCUMENTS 5,381,404 A * 1/1995 Sugano ............... H04L 41/5022
370/238
6,658,479 B1 * 12/2003 Zaumen et al. ............... 709/238
6,665,702 B1 * 12/2003 Zisapel et al. ................ 718/105
6,807,156 B1 * 10/2004 Veres .................... H04L 41/5067
370/252
7,016,685 B1 * 3/2006 Cain et al. ..................... 455/453
7,111,074 B2 * 9/2006 Basturk ......................... 709/241
7,158,796 B2 * 1/2007 Tiedemann et al. .......... 455/453
7,554,971 B2 * 6/2009 Smith ..................... H04L 12/66
370/231
7,680,925 B2 * 3/2010 Sathyanarayana et al. .. 709/224
7,822,064 B2 * 10/2010 Thubert et al. ............... 370/468
7,881,190 B2 * 2/2011 De Cnodder ........... H04L 47/10
370/230
7,983,163 B2 * 7/2011 Denecheau et al. .......... 370/232
8,170,022 B2 * 5/2012 Tychon et al. ................ 370/392
8,254,930 B1 * 8/2012 Mauer et al. .................. 455/436

(Continued)

FOREIGN PATENT DOCUMENTS

GB 2454872 A * 5/2009 ............ H04W 36/38

OTHER PUBLICATIONS

PCT /US 2012/043954, Partial Search Report dated Sep. 21, 2012.

*Primary Examiner* — Ricky Ngo
*Assistant Examiner* — Dewanda Samuel
(74) *Attorney, Agent, or Firm* — Harness, Dickey & Pierce, P.L.C.

(57) ABSTRACT

Various methods are provided to address the need for improved load balancing. In a one method, a packet loss is determined (101) for traffic sent between a first network node and a second network node. The determined packet loss is then used to determine (103) whether to perform load balancing. In another method, a first network node receives a request from a neighboring network node for a current loading status of the first network node. The first network node sends to the neighboring network node an indication of a backhaul loading level of the first network node.

15 Claims, 4 Drawing Sheets

(56) References Cited

U.S. PATENT DOCUMENTS

| | | |
|---|---|---|
| 8,264,966 B1* | 9/2012 | Shah et al. .................... 370/237 |
| 8,422,424 B1* | 4/2013 | VonFeldt et al. ............. 370/328 |
| 8,570,962 B2* | 10/2013 | Gage ............................ 370/329 |
| 8,937,865 B1* | 1/2015 | Kumar ................. H04L 47/125 |
| | | 370/235 |
| 2002/0176359 A1 | 11/2002 | Durinovic-Johri et al. |
| 2003/0156543 A1* | 8/2003 | Sahinoglu et al. ........... 370/238 |
| 2006/0215556 A1* | 9/2006 | Wu ........................ H04W 4/12 |
| | | 370/230 |
| 2008/0248807 A1* | 10/2008 | Kim et al. .................... 455/453 |
| 2008/0291826 A1 | 11/2008 | Licardie et al. |
| 2010/0061232 A1* | 3/2010 | Zhou et al. .................... 370/230 |
| 2010/0091667 A1* | 4/2010 | Kazmi et al. ................. 370/252 |
| 2010/0149979 A1 | 6/2010 | Denecheau |
| 2011/0105139 A1* | 5/2011 | On ................................ 455/453 |
| 2011/0158184 A1* | 6/2011 | Agulnik et al. .............. 370/329 |
| 2011/0230198 A1* | 9/2011 | Phan et al. .................... 455/450 |
| 2011/0252477 A1* | 10/2011 | Sridhar et al. ................. 726/24 |
| 2011/0299422 A1* | 12/2011 | Kim et al. .................... 370/253 |
| 2012/0250509 A1* | 10/2012 | Leung et al. ................. 370/235 |

* cited by examiner

METHOD FOR IMPROVED LOAD BALANCING IN COMMUNICATION SYSTEMS

FIELD OF THE INVENTION

The present invention relates generally to communications and, in particular, to load balancing in communication systems.

BACKGROUND OF THE INVENTION

This section introduces aspects that may help facilitate a better understanding of the inventions. Accordingly, the statements of this section are to be read in this light and are not to be understood as admissions about what is prior art or what is not prior art.

The present solution for SON (Self Optimizing Network) Mobility Load Balancing is to balance the load between different eNBs (evolved Node Bs) while attempting to minimize the number of handovers. Currently, this includes only the radio load. Each eNB monitors its radio load, exchanges radio load estimates over X2, identifies the need to do load balancing and then alters handover parameters. After that, certain UEs (user equipment) are handed over from one eNB to another eNB through the X2 interface. Unbalanced load situations are detected by measuring usage of radio resources (total transmit power, interference and throughput).

Since the traffic load is balanced only by considering radio resources, there are situations in which UEs may be transferred to an eNB with much lower backhaul capacity (say multiple T1s, instead of fiber) which can result in poor overall end-to-end performance (QoE, D/DV/Jitter, etc.). Thus, new solutions that are able to improve present-day load balancing techniques would meet a need and advance wireless communications generally.

Figure 1:
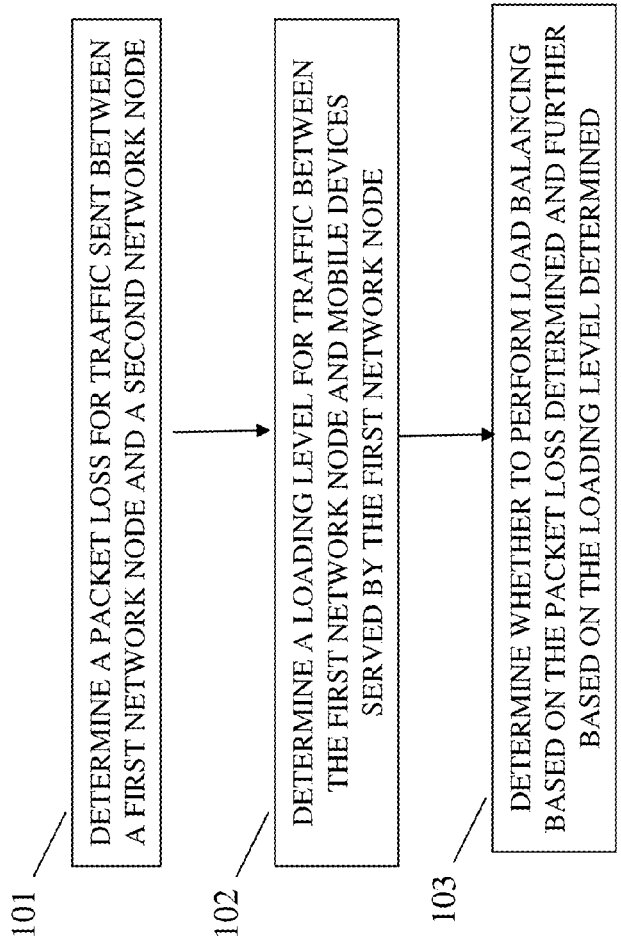
FIG. 1 is a logic flow diagram of functionality performed by a network node in accordance with various embodiments of the present invention.

Specific embodiments of the present invention are disclosed below with reference to FIGS. 1-4. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the logic flow diagrams above are described and shown with reference to specific steps performed in a specific order, some of these steps may be omitted or some of these steps may be combined, sub-divided, or reordered without departing from the scope of the claims. Thus, unless specifically indicated, the order and grouping of steps is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

SUMMARY OF THE INVENTION

Various methods are provided to address the need for improved load balancing. In a first method, a packet loss is determined for traffic sent between a first network node and a second network node. The determined packet loss is then used to determine whether to perform load balancing.

Many embodiments are provided in which the first method is modified. For example, in many embodiments the first network node comprises an eNB (evolved Node B) and the second network node comprises at least one of a SGW (Serving Gateway) or a PGW (Packet Data Network Gateway). In many embodiments, determining the packet loss for traffic sent between the first network node and the second network node involves determining an Ethernet frame loss for the traffic. Also, depending on the embodiment, the packet loss determined may just be the packet loss for high priority traffic sent between the first network node and the second network node, while in other embodiments the packet loss for medium and/or low priority traffic may also be determined.

In some embodiments, a loading level for traffic between the first network node and mobile devices served by the first network node is also determined, and this loading level is used to determine whether to perform load balancing in addition to the packet loss that was determined. For example, in certain embodiments, determining whether to perform load balancing involves determining whether a cost function exceeds a threshold, wherein the cost function is computed from the packet loss determined and the loading level determined and wherein the packet loss determined comprises a packet loss for at least one of high priority traffic sent between the first network node and the second network node, medium priority traffic sent between the first network node and the second network node, or low priority traffic sent between the first network node and the second network node.

In some embodiments, a request is sent to at least one neighboring network node for a current loading status of that neighboring network node. Furthermore, a current loading status may be received from at least one neighboring network node indicating a wireless loading level of that neighboring network node and a backhaul loading level of that neighboring network node. Using the at least one current loading status received, load balancing may then be performed.

In a second method, a first network node receives a request from a neighboring network node for a current loading status of the first network node. The first network node sends to the neighboring network node an indication of a backhaul loading level of the first network node.

Many embodiments are provided in which the second method is modified. For example, in many embodiments, the first network node also sends to the neighboring network node an indication of a loading level for traffic between the first network node and mobile devices served by the first network node. In many embodiments, a packet loss for traffic sent between the first network node and a second network node is also determined and the backhaul loading level is then determined using the packet loss. In many embodiments, the first network node comprises an eNB (evolved Node B) and the second network node comprises at least one of a SGW (Serving Gateway) or a PGW (Packet Data Network Gateway).

In many embodiments, determining the packet loss for traffic sent between the first network node and the second network node involves determining an Ethernet frame loss for the traffic. Depending on the embodiment, determining the backhaul loading level using the packet loss involves determining a packet loss parameter value to indicate a range of packet loss values in which the determined packet loss is included. Also, depending on the embodiment, an indication of the packet loss parameter value is also indicated by the indication of the backhaul loading level of the first network node that is sent.

DETAILED DESCRIPTION OF EMBODIMENTS

Figure 3:
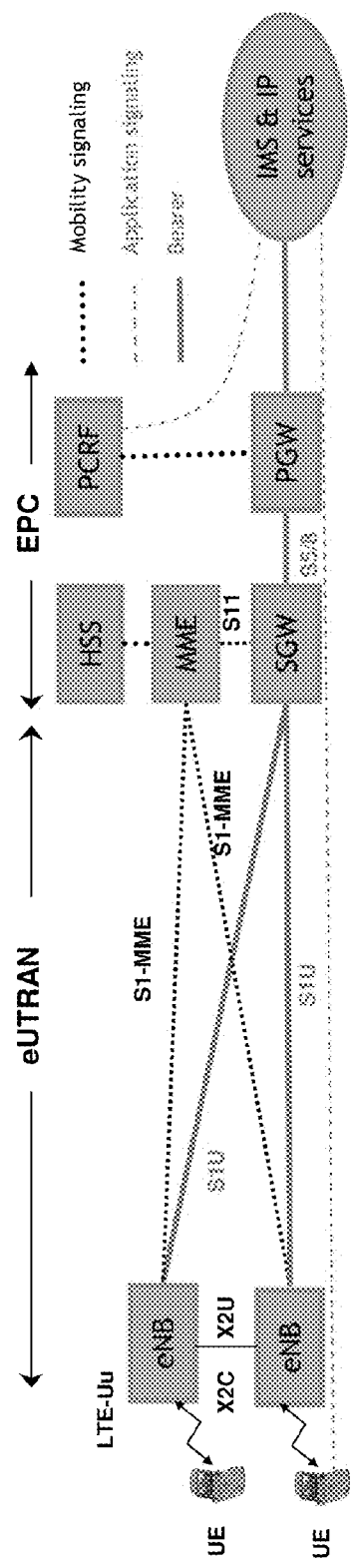
FIG. 3 is a block diagram depiction of an LTE communication network, in accordance with various embodiments of the present invention.
Figure 4:
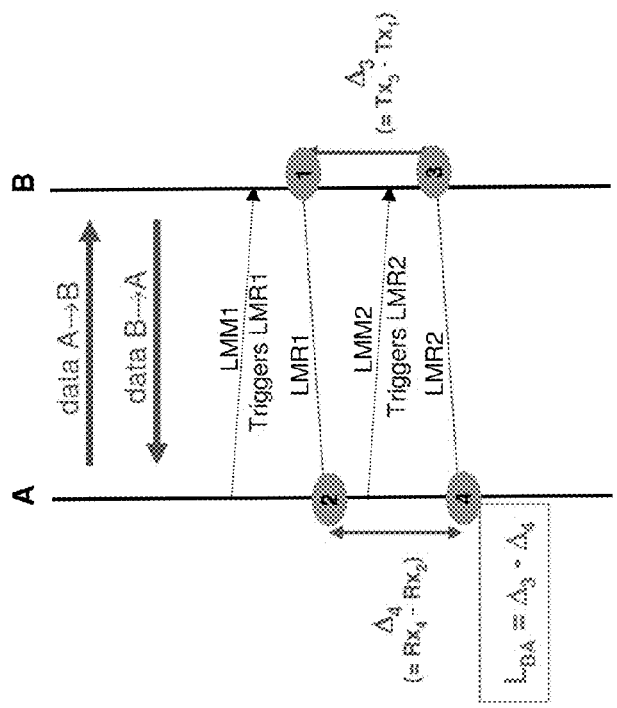
FIG. 4 is a messaging flow diagram depicting the measurement of Ethernet frame loss between Node B (SGW or PGW) and Node A (eNB), in accordance with various embodiments of the present invention.

To provide a greater degree of detail in making and using various aspects of the present invention, a description of our approach to load balancing and a description of certain, quite specific, embodiments follows for the sake of example. FIGS. 3 and 4 are referenced in an attempt to illustrate some examples of specific embodiments of the present invention for LTE (Long Term Evolution) communication networks.

FIG. 3 is a block diagram depiction of an LTE communication network 300, in accordance with various embodiments of the present invention. As depicted, network 300 includes eNBs (evolved Node Bs), a MME (Mobility Management Entity), a SGW (Serving Gateway), a PGW (Packet Data Network Gateway), an HSS, and a PCRF. Network 300 preferably communicates with user equipment (UEs) and IMS & IP services.

In general, the load balancing decision process, as proposed in these embodiments, is not just based on the RAN (Radio Access Network) traffic load but also on the measured backhaul (BH) load between the eNB and the SGW, or between the eNB and the PGW.

Thus, each eNB determines (measures and then estimates) the backhaul load and then considers this load when balancing traffic between eNBs. The network load is estimated by measuring the Ethernet frame loss between itself (eNB) and the SGW or PGW, using Ethernet Performance Monitoring (ITU_T Y.1731) frame loss measurements (LMM, LMR) for High Priority, Medium Priority and Low Priority traffic. Alternatively, one could just use the frame loss measurements for the High Priority traffic. The premise is that the Ethernet frame loss on a link is a reliable indicator of the network load. If the Ethernet frame loss between eNB and SGW (or eNB and PGW) is more, the network load is likely to be higher.

Currently, load balancing in LTE is performed by considering only the radio load. However, this approach does not necessarily lead to better performance end-to-end due to bottlenecks elsewhere. Estimates of the network load allows each eNB to do load balancing based on a minimization of a cost function that includes both the radio load and backhaul load. For example, in certain embodiments the following steps are performed:

1) eNB gets inputs from UE to determine radio load. Currently, these may include: average number of DL/UL PRBs that were scheduled over a period indicated in measurement time for RT, n-RT traffic, UL RACH PRB. Optional: Intercell Interference Indicator for each RB.
2) Is radio load>threshold?
3) If yes: Measure the backhaul (BH) load between the eNB and the PGW. This is done by measuring the Ethernet frame loss between the eNB and one or more PGW's for HP/MP/LP traffic separately. A parameter "Packet Loss Parameter" is defined that indicates the BH load as follows. For example:

Packet Loss Parameter=10, if Ethernet frame loss>=$10^{-1}$
Packet Loss Parameter=9, if Ethernet frame loss>=$10^{-2}$
Packet Loss Parameter=8, if Ethernet frame loss>=$10^{-3}$
Packet Loss Parameter=7, if Ethernet frame loss>=$10^{-4}$
:
:
Packet Loss Parameter=1, if Ethernet frame loss>=$10^{-7}$
Packet Loss Parameter=0, if Ethernet frame loss<$10^{-7}$
(The Ethernet frame loss is measured for HP/MP/LP traffic separately.)

4) Source eNB computes the cost function (CF):

$$CF=w1*\text{radio load}+w2*\text{Packet Loss Parameter (for HP)}+w3*\text{Packet Loss Parameter (for MP)}+w4*\text{Packet Loss Parameter (for LP)}$$

where w1-w4 are weights, and packet loss parameter is on a scale of 1-10.

5) If cost function (CF) is >threshold, then will load balancing occur.

If an eNB experiences high (radio+BH) load, it sends a request message to neighboring eNBs asking them to report their load status. This load status should include both the radio load and the BH load ("Packet Loss Parameter") as above. Once the requesting eNB receives the measurements, it can then determine how to reduce its load through load balancing.

ITU-T specifies Ethernet two-way frame loss measurements. This allows the originating node (eNB) to determine the Ethernet frame loss between itself and say the SGW, either in the downlink direction as shown in messaging diagram 400 in FIG. 4 (from PGW/SGW (node B) to eNB (node A)) or in the uplink direction (from eNB to SGW/PGW). The two-way Ethernet frame loss measurement uses the frame loss measurement request (LMM) and frame loss measurement reply (LMR) frames.

The source (eNB) sends out a LMM frame (LMM1, as specified in ITU-T Y.1731). This triggers a LMR response (LMR1) from the SGW or PGW with a counter corresponding to the transmit count of the number of Ethernet frames. The LMR is transmitted back to the originating end point (eNB). This is repeated again (LMM2, LMR2) after a time interval $\Delta_1$. The receiving eNB can measure the received number of Ethernet frames each time ($\Delta_4$: number of frames received by A in the given time interval). The eNB can then calculate the frame loss for data traffic riding along the bearer path in the B→A direction, i.e. the traffic sent by B—the traffic received by A($\Delta_3$-$\Delta_4$ where $\Delta_3$ is the number of frames sent by B). A needs to know 2 counter values from B, Tx1 and Tx3; therefore, A needs two loopbacks (LMM/LMR) to get them. Thus, ETH-LM measurement helps the eNB determine the Ethernet frame loss in the downlink direction. Similar measurements, if needed, can be made in the uplink direction.

The detailed and, at times, very specific description above is provided to effectively enable a person of skill in the art to make, use, and best practice the present invention in view of what is already known in the art. In the examples, specifics are provided for the purpose of illustrating possible embodiments of the present invention and should not be interpreted as restricting or limiting the scope of the broader inventive concepts.

Figure 2:
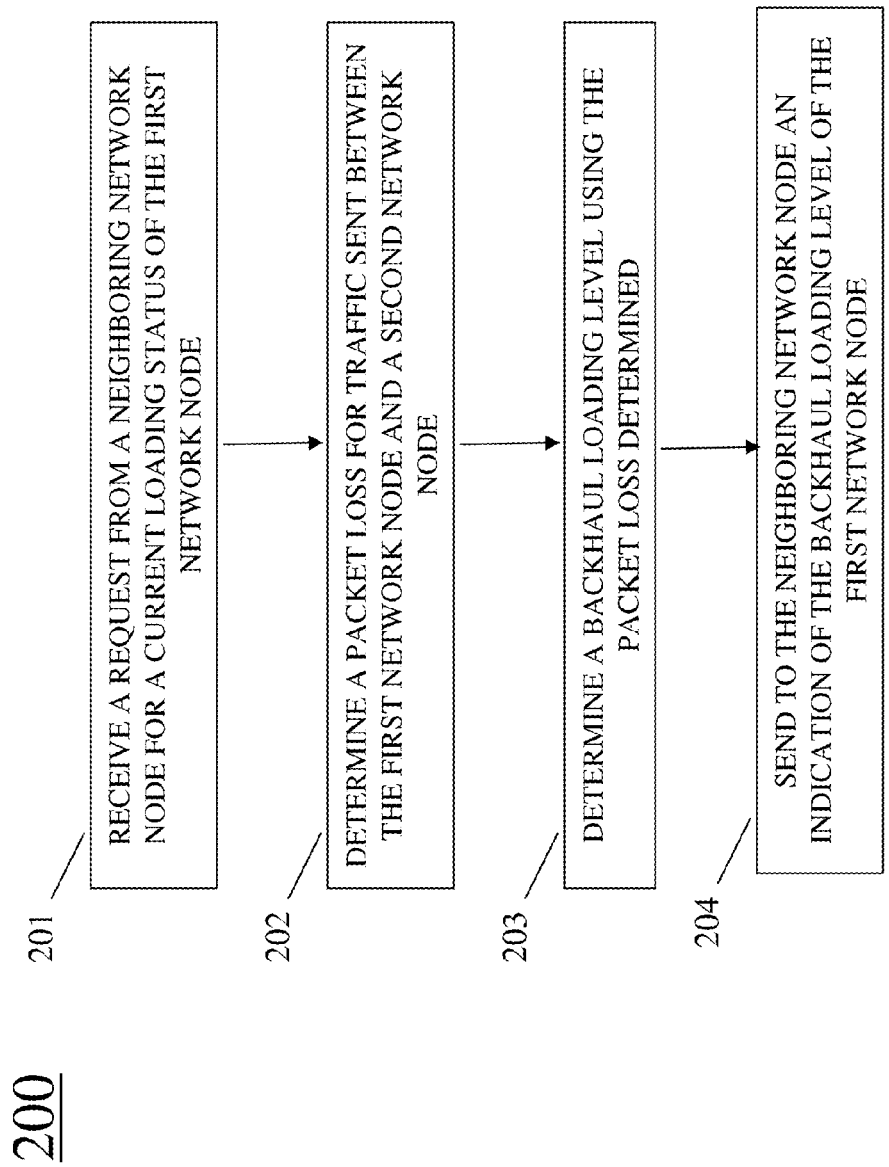
FIG. 2 is a logic flow diagram of functionality performed by a network node in accordance with various embodiments of the present invention.

Aspects of embodiments of the present invention can be further understood with reference to FIGS. 1 and 2. Diagram 100 of FIG. 1 is a logic flow diagram of functionality performed by a network node in accordance with various embodiments of the present invention. In the method depicted in diagram 100, a first network node determines (101) a packet loss for traffic sent between the first network node and a second network node. The determined packet loss is then used to determine (103) whether to perform load balancing.

In many embodiments, determining the packet loss for traffic sent between the first network node and the second network node involves determining an Ethernet frame loss for the traffic. Also, depending on the embodiment, the packet loss determined may just be the packet loss for high priority traffic sent between the first network node and the second network node, while in other embodiments the packet loss for medium and/or low priority traffic may also be determined.

In some embodiments, a loading level for traffic between the first network node and mobile devices served by the first network node is also determined (102), and this loading level is used to determine (103) whether to perform load balancing in addition to the packet loss that was determined. For example, in certain embodiments, determining whether to perform load balancing involves determining whether a cost function exceeds a threshold, wherein the cost function is computed from the packet loss determined and the loading level determined and wherein the packet loss determined comprises a packet loss for at least one of high priority traffic sent between the first network node and the second network node, medium priority traffic sent between the first network node and the second network node, or low priority traffic sent between the first network node and the second network node.

Diagram 200 of FIG. 2 is a logic flow diagram of functionality performed by a network node in accordance with various embodiments of the present invention. In the method depicted in diagram 200, a first network node receives (201) a request from a neighboring network node for a current loading status of the first network node. The first network node sends (204) to the neighboring network node an indication of a backhaul loading level of the first network node.

In many embodiments, the first network node also sends to the neighboring network node an indication of a loading level for traffic between the first network node and mobile devices served by the first network node. In many embodiments, a packet loss for traffic sent between the first network node and a second network node is also determined (202) and the backhaul loading level is then determined (203) using the packet loss.

In many embodiments, determining the packet loss for traffic sent between the first network node and the second network node involves determining an Ethernet frame loss for the traffic. Depending on the embodiment, determining the backhaul loading level using the packet loss involves determining a packet loss parameter value to indicate a range of packet loss values in which the determined packet loss is included. Also, depending on the embodiment, an indication of the packet loss parameter value is also indicated by the indication of the backhaul loading level of the first network node that is sent (204).

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

What is claimed is:

1. A method for load balancing, the method comprising:
   determining, by a first network node, a loading level between the first network node and at least one end device served by the first network node;
   determining, by the first network node, a plurality of packet losses for traffic sent between the first network node and a second network node, the traffic having different priority levels and each of the plurality of packet losses corresponding to one of the different priority levels; and
   determining, by the first network node, to perform the load balancing based on a cost function that is a weighted combination of the determined loading level and the determined plurality of packet losses corresponding to the different priority levels of the traffic.

2. The method as recited in claim 1, wherein the first network node is an evolved Node B (eNB) and the second network node is one of a Serving Gateway (SGW) or a Packet Data Network Gateway (PGW).

3. The method as recited in claim 1, wherein the determining the plurality of packet losses for the traffic sent between the first network node and the second network node comprises:
   determining an Ethernet frame loss for traffic sent between the first network node and the second network node.

4. The method as recited in claim 1, wherein the determining to perform the load balancing comprises:
   determining whether the cost function exceeds a threshold, wherein
   the cost function is computed from the plurality of packet losses and the loading level, and
   the plurality of packet losses includes a first packet loss for high priority traffic sent between the first network node and the second network node, a second packet loss for medium priority traffic sent between the first network node and the second network node, and third packet loss for low priority traffic sent between the first network node and the second network node.

5. The method as recited in claim 1, further comprising:
   sending a request to at least one neighboring network node for a current loading status of the neighboring network node.

6. The method as recited in claim 5, further comprising:
   receiving from the at least one neighboring network node the current loading status of the at least one neighboring network node, wherein the current loading status of the at least one neighboring network node indicates a wireless loading level of the at least one neighboring network node and a backhaul loading level of the at least one neighboring network node.

7. The method as recited in claim 6, further comprising:
   performing the load balancing using the current loading status received from the at least one neighboring network node.

8. A method for load balancing, the method comprising:
   receiving, by a first network node, a request from a neighboring network node for a current loading status of the first network node;
   determining, by the first network node, a loading level for traffic sent between the first network node and at least one end device served by the first network node;
   determining, by the first network node, a backhaul loading level of the first network node based on a cost function that is a weighted combination of the determined loading level for the traffic sent between the first network node and the at least one end device served by the first network node and a plurality of packet losses for traffic sent between the first network node and a second network node, the traffic having different priority levels and each of the plurality of packet losses corresponding to one of the different priority levels; and
   sending, by the first network node to the neighboring network node, the loading level and the backhaul loading level as the current loading status of the first network node to the neighboring network node, the neighboring network node performing the load balancing based on the current loading status and the loading level sent by the first network node.

9. The method as recited in claim 8, wherein the first network node is an evolved Node B (eNB) and the second network node is one of a Serving Gateway (SGW) or a Packet Data Network Gateway (PGW).

10. The method as recited in claim 8, wherein the determining the plurality of packet losses for the traffic sent between the neighboring network node and the other network node includes determining an Ethernet frame loss for the traffic sent between the first network node and the second network node.

11. The method as recited in claim 8, wherein the determining the backhaul loading level using the plurality of packet losses comprises:
   determining a packet loss parameter value to indicate a range of packet loss values in which the plurality of packet losses are included.

12. The method as recited in claim 11, wherein the sending the indication of the backhaul loading level of the first network node includes sending an indication of the packet loss parameter value.

13. A method for load balancing, the method comprising:
   determining, by a first network node, a plurality of packet losses for traffic sent between the first network node and a second network node, the determined packet loss including a first packet loss for at least one of high priority traffic sent between the first network node and the second network node, a second packet loss for medium priority traffic sent between the first network node and the second network node, and a third packet loss for low priority traffic sent between the first network node and the second network node;
   determining, by the first network node, a loading level for traffic between the first network node and mobile devices served by the first network node; and
   determining, by the first network node, to perform load balancing by determining whether a cost function exceeds a threshold, the cost function being computed from the determined plurality of packet losses and the determined loading level.

14. A non-transitory computer-readable medium comprising computer-readable instructions, which when executed by a processor, cause the processor to perform load balancing by,
   determining, by a first network node, a loading level between the first network node and at least one end device served by the first network node;
   determining, by the first network node, a plurality of packet losses for traffic sent between the first network node and a second network node, the traffic having different priority levels and each of the plurality of packet losses corresponding to one of the different priority levels; and
   determining, by the first network node, to perform the load balancing based on a cost function that is weighted a combination of the determined loading level and the determined plurality of packet losses corresponding to the different priority levels of the traffic.

15. A network node comprising:
   a memory having computer-readable instructions stored thereon; and
   a processor configured to execute the computer-readable instructions to perform load balancing by,
      determining, by a first network node, a loading level between the first network node and at least one end device served by the first network node;
      determining, by the first network node, a plurality of packet losses for traffic sent between the first network node and a second network node, the traffic having different priority levels and each of the plurality of packet losses corresponding to one of the different priority levels; and determining, by the first network node, to perform the load balancing based on a cost function that is weighted a combination of the determined loading level and the determined plurality of packet losses corresponding to the different priority levels of the traffic.

* * * * *